Figure 1:
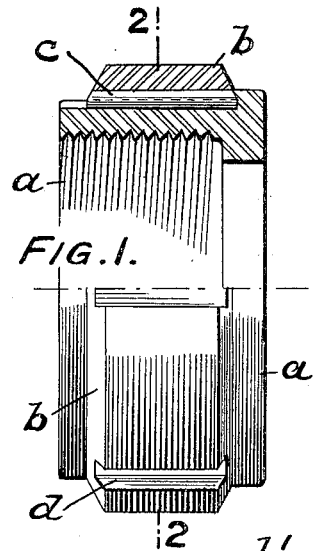

S. L. KNEASS.
COUPLING NUT.
APPLICATION FILED NOV. 28, 1913.

1,103,591.

Patented July 14, 1914.

WITNESSES:
Rob'l R Kitchel
E. E. Wall

INVENTOR
Strickland L. Kneass
BY Frank S. Busser
ATTORNEY.

UNITED STATES PATENT OFFICE.

STRICKLAND L. KNEASS, OF PHILADELPHIA, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

COUPLING-NUT.

1,103,591.　　　　Specification of Letters Patent.　　Patented July 14, 1914.

Application filed November 28, 1913. Serial No. 803,632.

*To all whom it may concern:*

Be it known that I, STRICKLAND L. KNEASS, a citizen of the United States, residing at Philadelphia, county of Philadelphia, and State of Pennsylvania, have invented a new and useful Improvement in Coupling-Nuts, of which the following is a full, clear, and exact description, reference being had to the accompanying drawings, which form a part of this specification.

My invention relates to coupling nuts for connecting separate portions of pipes, or pipes to valves, injectors or other devices operated by or with fluids. Such coupling nuts are subject to serious strain, the main causes of which are tension between the collar and the threads, bending of the pipes, internal fluid pressure, and the damaging action of the wrench or set during removal, adjustment or replacement. If the nut is made of too soft material, there is danger of cutting a new thread by the entering screw, of stripping of the threads and of the distortion or breakage of the metal of the exterior grooves or hexagon by the frequent or careless use of the spanner or other form of wrench. This may cause serious damage or injury by failure or by enforced delay. If the nut is made of iron or steel, the action of the wrench is less injurious, but the nut is apt to cut or strip the thread of the coupling upon which it is screwed, or to split under strain. Accidents have occurred from this cause.

The object of my invention is to provide a coupling nut or connection which will not cut or abrade the threads upon which it is screwed when abraded or cut by it and whose exterior will be strong and durable and able to withstand, without fracture or damage, the action of the wrench during the adjustment or removal of the nut. To this end I make the interior portion of the nut of brass or other non-rusting material sufficiently strong and durable to maintain its own thread diameter and pitch without distortion, and the exterior portion of relatively hard material, such as steel or iron.

A further object of my invention is to securely attach the outer and inner parts of the nut so that there shall be no independent movement of the parts.

I attain the above objects in and by the constructions shown in the drawings, which illustrate different embodiments of my invention and in which—

Figure 2:
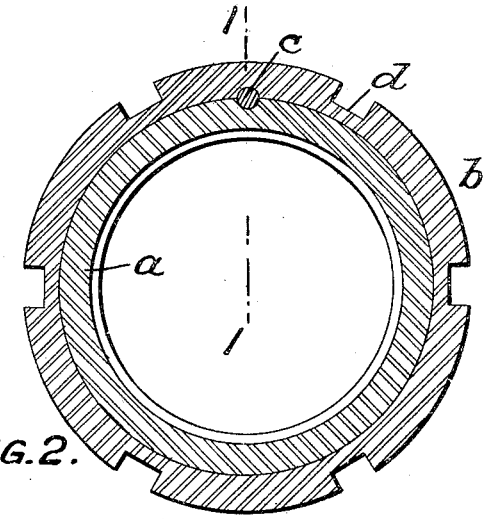

Figures 1 and 2 are sectional views of a coupling nut embodying my invention; Fig. 1 being a section on the line 1—1 of Fig. 2 and Fig. 2 a section on the line 2—2 of Fig. 1. Figs. 3 and 4, 5 and 6, 7 and 8, and 9 and 10, are views, similar to Figs. 1 and 2, of other embodiments of the invention.

In the form shown in Figs. 1 and 2, the interior threaded ring $a$, of brass or other non-rusting material sufficiently strong and durable to maintain its own thread without distortion or alteration, and the tightly-fitting outer or encircling ring $b$, of steel or other material harder than that of the ring or band $a$, are made separate and are brazed or forced together by pressure in the direction of the axis of the nut, or the interior brass ring is cast within the encircling ring $b$ in a mold. The rings are keyed together by a pin or pins $c$ which extend parallel to the axis of the nut and intersect the adjacent faces of the ring. The outer ring or band tightly encircles the inner threaded ring and is held firmly from lateral movement by the dovetail extension of the sides of the brass casting, and is provided with grooves $d$ adapted to be engaged by the wrench or spanner, whereby the nut may be turned.

In the forms shown in Figs. 3 to 10 inclusive, the outer ring or band of steel or other hard material is placed in a mold and the melted brass poured against it, thus forming a mechanical connection with the outer ring or band. The outer ring extends into the mold recess and its sides are beveled so as to form a dovetail connection between the two rings of the finished nut.

Figure 3:
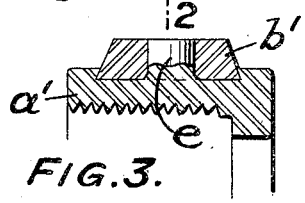
Figure 4:
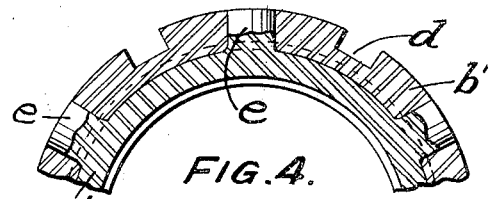

In the form shown in Figs. 3 and 4, the band $b'$ is provided with holes or orifices extending entirely through it from its outer to its inner faces, and the melted brass runs into and fills these orifices, thus forming, integral with the inner ring $a'$, plugs $e$, extending entirely through the band $a'$. The plugs $e$ are preferably at the same distances apart as the spanner grooves $d$ but alternate therewith.

Figure 5:
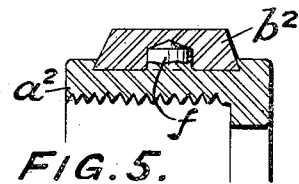
Figure 6:
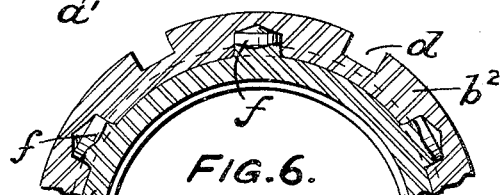

In the form shown in Figs. 5 and 6, the band $b^2$ is provided with holes or recesses in its inner wall, said recesses being similar to the orifices in the band $b'$ of Figs. 3 and 4 but not extending entirely through. The melted brass flows into and fills these recesses, thus forming, integral with the inner ring $a^2$, plugs $f$ extending into, but not entirely through, the band $a^2$. The plugs $f$ are preferably arranged alternately with the spanner grooves $d$.

Figure 7:
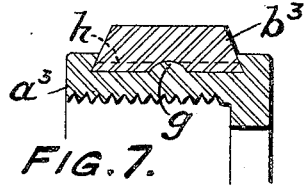
Figure 8:
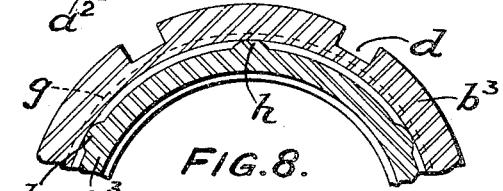

In the form shown in Figs. 7 and 8, the band $b^3$ is provided with a circumferential groove extending entirely around its inner wall and also with a number of grooves in its inner wall extending transversely of the ring from side to side. The melted brass, flowing into these grooves, forms, integral with the inner ring $a^3$, a circumferential rib $g$ extending into the circumferential groove in the inner wall of the outer ring, and transverse ribs $h$ extending into the transverse grooves of the band.

In each of the constructions hereinbefore described, the surrounding band of iron or steel is made narrower than the internal threaded brass ring and is partially contained within it, the sides of the interior ring extending beyond that of the band.

Figure 9:
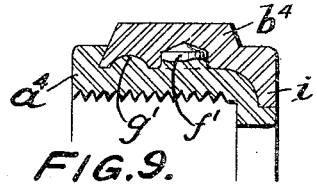
Figure 10:
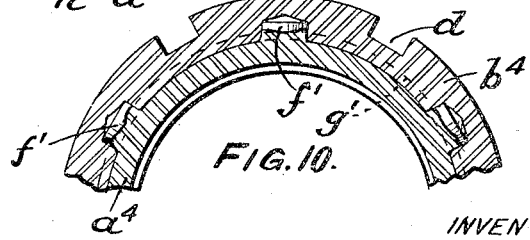

In Figs. 9 and 10 the inner ring $a^4$ is provided with a circumferential rib $g'$ (similar to the rib $g$ of Figs. 7 and 8) and plugs $f'$ (similar to the plugs $f$ of Figs. 5 and 6) which extend respectively within a corresponding groove and recesses in the band $b^4$. The outer ring $b^4$ is provided with an internal flange or thrust collar $i$ at the side corresponding to the flanged side of the nut, this flange forming part of the wall of the mold orifice, thus producing a nut in which the thrust collar, or outer wall of the flange is largely composed of the harder metal.

While I prefer to make the inner and outer rings respectively of brass and steel, it will be understood that other metals or materials having the qualities necessary may be substituted for the metals mentioned. It will also be understood that my invention is not limited to the several embodiments herein specifically set forth, the same merely illustrating different ways by means of which the two rings may be unremovably secured together.

Having now fully described my invention, what I claim and desire to protect by Letters Patent is:

1. A coupling connection comprising a ring having a screw thread permanently formed thereon, said ring of a non-rusting material sufficiently strong and durable to maintain its own thread diameter and pitch without distortion, and an unremovable encircling band of relatively hard material held from lateral and circumferential movement relatively to the ring.

2. A coupling connection comprising a ring of non-rusting material having a thread permanently formed thereon, and an encircling band of relatively hard material and of less width than the inner ring and held from lateral and circumferential movement relatively to the ring.

3. A coupling connection comprising a ring of non-rusting material having an interior screw thread permanently formed thereon and forming the nut proper, and an encircling band of relatively hard material and of less width than the inner ring, said band being held from lateral and circumferential movement relatively to the ring and provided with spanner grooves.

4. A coupling connection comprising a threaded ring of non-rusting material and an unremovable encircling band of relatively hard material provided with an internal flange whose outer wall is flush with the corresponding wall of the threaded ring, whereby the nut has a thrust collar largely composed of the hard material.

5. A coupling connection comprising a threaded ring of non-rusting material having a part thereof of greater thickness than another part, and an unremovable band of relatively hard material encircling the thinner part of the nut and abutting against the surface connecting the thicker and thinner parts.

6. A coupling connection comprising a threaded ring of non-rusting material having a part thereof of greater thickness than another part, said thicker part overhanging the thinner part to form on the outer surface of the latter a seat having an undercut side wall, and an encircling band of relatively hard material applied to said seat and unremovably secured to the ring.

7. A coupling connection comprising a threaded ring of non-rusting material and an outer encircling band of relatively hard material, one member of the nut having circumferentially extending grooves and the other member having circumferential ribs extending into said grooves and the two members being unremovably secured one to the other.

In testimony of which invention, I have hereunto set my hand, at Philadelphia, on this 26th day of November, 1913.

STRICKLAND L. KNEASS.

Witnesses:
 E. E. WALL,
 M. M. HAMILTON.